R. W. MARVELL.
SELF HEATING SOLDERING IRON.
APPLICATION FILED JAN. 24, 1912.
1,080,644.
Patented Dec. 9, 1913.
2 SHEETS—SHEET 2.
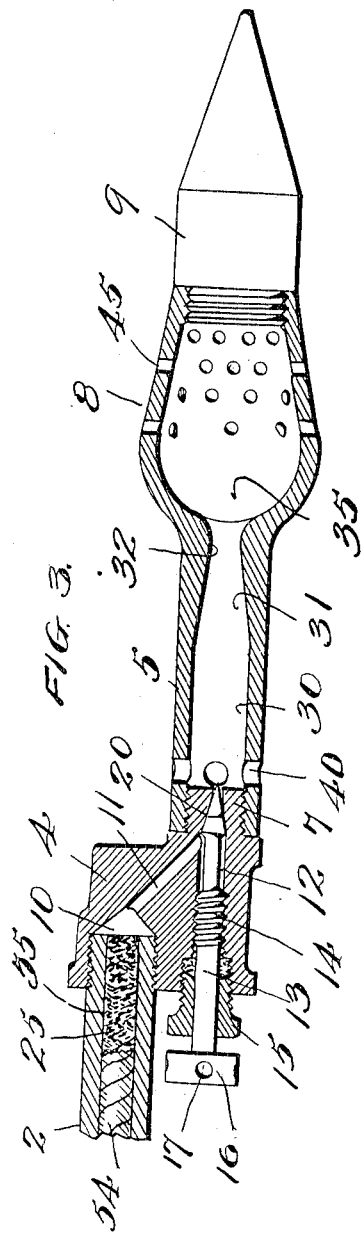
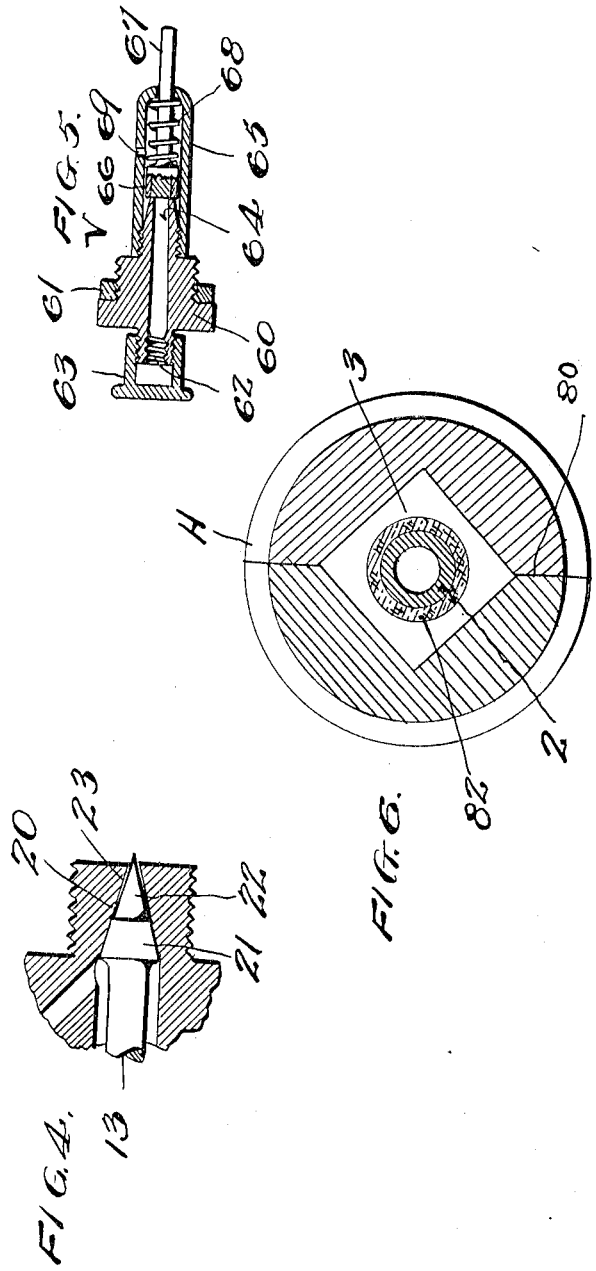
WITNESSES
INVENTOR
R. W. Marvell
Attorney

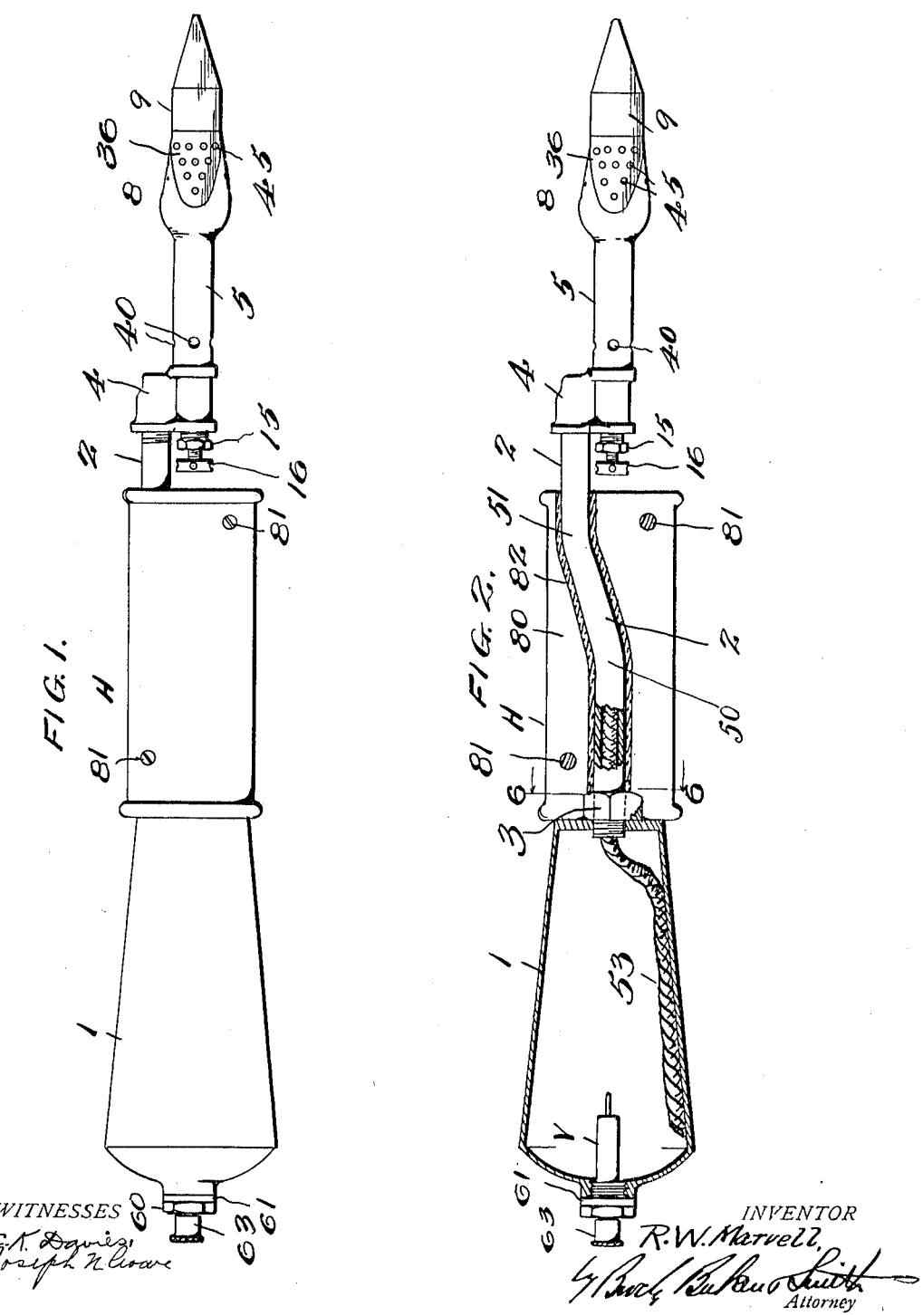

UNITED STATES PATENT OFFICE.

ROY W. MARVELL, OF BALTIMORE, MARYLAND, ASSIGNOR, BY MESNE ASSIGNMENTS, TO LYON, CONKLIN & COMPANY, A CORPORATION OF DELAWARE.

SELF-HEATING SOLDERING-IRON.

1,080,644.  Specification of Letters Patent.  Patented Dec. 9, 1913.

Application filed January 24, 1912. Serial No. 673,269.

*To all whom it may concern:*

Be it known that I, ROY W. MARVELL, a citizen of the United States, and a resident of Baltimore, Maryland, have invented a new and useful Self-Heating Soldering-Iron, of which the following is a specification.

Among the objects of my invention are to provide in connection with a soldering tip, a reservoir for liquid fuel, such as gasolene, means for putting the fuel under pressure, a burner and mixing tube of novel construction by which a very hot flame is applied to the base of the tip with a small rate of fuel consumption, and improved means for feeding and regulating the flow of fuel to the mixing tube.

Another object is to provide the device with a novel form of handle and to locate this handle so that the tool will be properly balanced in the hand of the user.

In addition to carrying out the foregoing objects, the invention consists in certain novel forms and combinations of parts, as will appear.

The accompanying drawing shows one exemplifying embodiment of the invention.

Figure 1 is a side view of a tool embodying the invention. Fig. 2 shows the reservoir, handle and part of the feed tube in longitudinal section. Fig. 3 is a longitudinal section of the combustion chamber, mixing tube, needle valve and adjacent end of the feed tube. Fig. 4 is an enlarged section of the needle valve. Fig. 5 is an enlarged longitudinal section of the check valve, and Fig. 6 is a cross-section on the line 6—6 of Fig. 2.

Reference character 1 designates, in general, a reservoir, the shape of which can, of course, be greatly varied. One end of the feed tube 2 is screwed into the reservoir by means of a nut 3. At the other end, the feed tube is screwed into a body 4 which contains the needle valve. The mixing tube 5 is screwed upon a projection 7 formed on the body 4. At the end of the mixing tube is the combustion chamber 8, and into the end of this is screwed the soldering tip or point 9, the shape of which may be greatly varied to suit particular necessities. Within the valve body 4, adjacent to the end of the feed pipe 2, is provided a small gasolene chamber 10. This is usually most conveniently formed by the point of the drill which bores the hole for the reception of the feed tube. From this chamber 10 a small conduit 11 leads to a valve chamber 12 of small size surrounding the stem 13 of the needle valve. This stem adjustably engages the body 4 by means of a screw-thread 14 and is provided with a suitable packing and packing nut 15 to make the stem liquid and vapor tight where it emerges from the valve body. On the outer end of the stem is a head 16 which may be knurled or provided with holes 17, as shown, for the adjustment of the valve. The valve seat 20 has a straight conical bore, as more clearly shown in Fig. 4. The valve, in the preferred construction as shown, comprises an inner conical portion 21 designed to exactly fit the valve seat and an outer more steeply tapered conical portion 22. This outer tapered portion leaves a gradually outwardly expanding space 23 between the valve and its seat communicating with the mixing tube 5.

As shown in Fig. 3, the inner form of the portion 30 of the mixing tube adjacent to the valve is cylindrical. But as the tube approaches the combustion chamber, the bore of the tube is inwardly tapered as at 31 to a restricted throat or nozzle 32 immediately adjacent to the combustion chamber. The cross-sectional shape of the interior of the combustion chamber is preferably circular, the head 35 or end of the chamber adjacent to the mixing tube usually being larger than the other end and tapering to meet the base of the soldering point, as shown. The outside of the combustion chamber is most conveniently formed into opposite flattened faces 36 so that a wrench or vise may be easily applied to the combustion chamber when it is desired to remove the point 9.

Air is supplied to the mixing tube through holes 40, desirably four in number, arranged as shown at the base of the mixing tube immediately adjacent to the point of entry of the needle valve. Products of combustion are discharged from the combustion chamber through holes 45, and the number and arrangement of these holes is important. It is desirable in most cases to have the size of the holes 45 bear approximately the relation to the size of the combustion chamber shown in the drawing, and when the holes are of this size it is desirable to have them arranged substantially as shown in the drawings, that is with about four holes on each side of the chamber immediately adjacent to the base of the soldering point and then to arrange the holes on each side extending away from the soldering point in staggered relation to the first series of holes, with one less hole in each row than in the preceding row, so that as shown in Figs. 1 and 3 the total area afforded by the holes for the passage of burned gas decreases rapidly away from the base of the tip. This arrangement provides just the right flue space for the discharge of burned gas and at the same time concentrates most of the hot flame on the base of the tip where it serves most effectively to heat the same.

The feed tube 2 is curved at the points 50, 51, to bring the combustion chamber and mixing tube in line with the reservoir, also for another purpose as will appear. A wick 53 extends from the top end of the reservoir through the feed tube 2 to a point 54 (Figs. 2 and 3) within the feed tube near the valve body 4. Between the end of the wick 53 and fuel chamber 10 is an asbestos packing 55, which is tightly packed into the end of the tube. This asbestos takes up the duty of a capillary feed for the fuel at the point where the wick stops and prevents burning out of the capillary feeding means, since the asbestos, of course, is not affected by heat to which the end of the feed tube 2 adjacent to the valve body 4 is subjected. The double tapered valve 20, 21, affords means for very closely regulating the fuel supply.

The construction of fuel passages and valve in combination with the described arrangement of mixing tube and combustion chamber produces a very vigorous draft and an intensely hot blue flame, the flame being confined entirely to the combustion chamber and concentrated mainly against the base of the point as it issues through the holes adjacent thereto. The point may be quickly heated to a cherry red and even melted in a very short time, unless the fuel feed is greatly restricted, and by proper adjustment the iron may, therefore, be used outdoors on the coldest days with perfect success.

Air pressure is supplied to and maintained in the reservoir by means of a novel check-valve, generally designated by the character V, Fig. 2, and shown in detail in Fig. 5. A nut 60 is screwed into the reservoir and is provided with a suitable packing 61. An extension 62 is interiorly threaded to receive a pump connection and exteriorly threaded to receive a cap 63. At the inner end of the nut is an extended nipple 64. A long thimble 65 is screwed onto the base of nipple 64 and accommodates a check-valve 66. A suitable packing in the end of this valve engages the end of the nipple. The valve stem 67 extends through a hole in the end of the thimble, which forms a guide for the movement of the valve. A spring 68 compressed between the end of the thimble and the valve urges the latter against its seat. A perforation 69 in the thimble permits air to pass from the pump past the check-valve to the reservoir, and when sufficient air has been forced into the reservoir, the check-valve retains this pressure in an obvious manner.

In ordinary soldering irons, the handle is at one end of a rod and the soldering point at the other end. This heavy point so far removed from the handle puts a severe strain on the hand and wrist of the user. In my self-heating iron I provide a handle H centrally located, so that the weight of the tool is evenly balanced and so that the user will not be fatigued even when the tool is used for a long time continuously. The handle comprises two blocks 80 of wood or other suitable material on the center line of the tool and each one is channeled out to fit the curved feed tube 2. At the end adjacent the reservoir, the blocks are also hollowed out to closely fit the nut 3, so that any tendency of the handle to rotate on the tube is prevented. The two blocks are clamped together by screws 81. Usually a sheathing or sleeve 82, conveniently of asbestos, is placed between the handle and the tube to insulate one from the other.

I claim:

1. In a soldering iron, the combination with a valve body and valve, of a mixing tube provided with air ports immediately adjacent the valve, a combustion chamber at the opposite end of said tube, the inner diameter of the tube being restricted at the point of entry to said combustion chamber, a soldering tip at the outer end of said chamber, the chamber being provided with a multiplicity of flue holes, the combined area of said holes decreasing from the base of said tip toward the opposite end of the chamber.

2. In a soldering iron, the combination of a mixing tube, a valve body at one end thereof, an enlarged inclosed combustion chamber at the other end of said tube, a solid soldering point screwed in the outer end of said chamber, said point having a solid substantially flat base exposed to flame in said chamber, a valve in the valve body for supplying fuel to the base of the mixing tube, air-supply openings in the tube adjacent to the valve, the mixing tube being unapertured from said openings to the combustion chamber, the mixing tube being also provided with a restricted throat or nozzle at the point of entry into the combustion chamber, the combustion chamber being provided on all sides with a multiplicity of flue holes, the combined area of said holes decreasing from the base of the soldering point toward the other end of the chamber.

3. In a soldering iron, the combination of a reservoir, a fuel conduit, a valve body secured at one end of the fuel conduit, a mixing tube secured to the valve body, a valve within the valve body, said valve discharging into one end of the mixing tube, the mixing tube being provided with air supply openings adjacent to the valve, a combustion chamber at the end of the mixing tube, the mixing tube being provided with a constricted nozzle at the point of entry into the combustion chamber, a soldering point secured in the outer end of the combustion chamber, the combustion chamber being provided with a multiplicity of flue holes, said holes being provided closer together and in greater number adjacent to the base of the soldering point, and decreasing in number and being spaced farther apart toward the opposite end of the combustion chamber.

ROY W. MARVELL.

Witnesses:
D. M. SMITH,
M. A. WOOD.